(12) United States Patent
Varahramyan et al.

(10) Patent No.: US 8,179,231 B1
(45) Date of Patent: May 15, 2012

(54) TRANSMISSION DELAY BASED RFID TAG

(75) Inventors: Khodadad Varahramyan, Ruston, LA (US); Mangilal Agarwal, Ruston, LA (US); Sudhir Shrestha, Ruston, LA (US); Jeevan Kumar Vemagiri, Bothell, WA (US); Aravind Chamarti, Painted Post, NY (US); Sireesha Ramisetti, Sunnyvale, CA (US)

(73) Assignee: Louisiana Tech Research Foundation, Ruston, LA (US)

( * ) Notice: Subject to any disclaimer, the term of this patent is extended or adjusted under 35 U.S.C. 154(b) by 1113 days.

(21) Appl. No.: 11/864,159

(22) Filed: Sep. 28, 2007

Related U.S. Application Data (60) Provisional application No. 60/827,249, filed on Sep. 28, 2006.

(51) Int. Cl.
| | |
|---|---|
| H04Q 5/22 | (2006.01) |
| G08B 13/14 | (2006.01) |
| H05K 3/02 | (2006.01) |
| G06K 19/06 | (2006.01) |

(52) U.S. Cl. .............. 340/10.1; 340/572.1; 340/572.5; 340/572.9; 29/846; 235/492

(58) Field of Classification Search .............. 340/10.1, 340/572.1, 572.5, 572.9; 29/846; 235/492
See application file for complete search history.

(56) References Cited

U.S. PATENT DOCUMENTS

| | | | | |
|---|---|---|---|---|
| 2,543,907 | A | * | 3/1951 | Gloess et al. ................... 341/88 |
| 2,574,271 | A | * | 11/1951 | Loughren ....................... 342/38 |
| 2,795,775 | A | * | 6/1957 | Mandel et al. .................. 331/74 |
| 3,305,785 | A | * | 2/1967 | Carroll, Jr. ..................... 327/271 |
| 3,585,499 | A | * | 6/1971 | Bolie ......................... 324/76.35 |
| 4,012,741 | A | | 3/1977 | Johnson |
| 4,096,477 | A | * | 6/1978 | Epstein et al. ................... 342/44 |
| 4,410,632 | A | | 10/1983 | Dilley et al. |
| 4,583,099 | A | * | 4/1986 | Reilly et al. .................. 343/895 |
| 4,617,522 | A | * | 10/1986 | Tarbutton et al. ............. 330/149 |
| 5,444,223 | A | * | 8/1995 | Blama ........................... 235/435 |
| 5,446,447 | A | * | 8/1995 | Carney et al. .............. 340/572.4 |
| 5,609,096 | A | | 3/1997 | Kwon et al. |
| 5,838,233 | A | * | 11/1998 | Hawes et al. ............. 340/572.5 |
| 5,973,598 | A | * | 10/1999 | Beigel ........................ 340/572.1 |
| 6,104,311 | A | * | 8/2000 | Lastinger ................... 340/10.51 |
| 6,304,169 | B1 | * | 10/2001 | Blama et al. ................. 340/10.1 |
| 6,400,322 | B2 | | 6/2002 | Fang et al. |
| 6,732,923 | B2 | * | 5/2004 | Otto .............................. 235/383 |
| 6,812,824 | B1 | | 11/2004 | Goldinger et al. |
| 6,906,682 | B2 | | 6/2005 | Alexopoulos |

(Continued)

OTHER PUBLICATIONS

Ramisetti, Sireesha, Design and Development of an ID generation circuit for low-cost passive RFID-based applications, 2005.

(Continued)

*Primary Examiner* — Daniel Wu
*Assistant Examiner* — Kam Ma
(74) *Attorney, Agent, or Firm* — Jones, Walker, Waechter, Poitevent, Carrere & Denegre, LLP (57) ABSTRACT

A chipless RFID tag system having a transmitter sending an input signal and a tag substrate. The tag substrate has at least one microstrip and the microstrip has a first portion with a first impedance and a second portion with a second impedance different from the first impedance. The system further includes a receiver detecting at least two reflections from an interface of the first and second impedances and identifying relative time domain positions of the reflections to one another.

6 Claims, 10 Drawing Sheets

U.S. PATENT DOCUMENTS

| | | | |
|---|---|---|---|
| 6,922,146 B2 * | 7/2005 | Yogev et al. | 340/568.2 |
| 7,015,868 B2 | 3/2006 | Puente Baliarde et al. | |
| 7,168,150 B2 * | 1/2007 | Eckstein et al. | 29/593 |
| 7,831,647 B1 * | 11/2010 | Lam | 708/319 |
| 2001/0035042 A1 | 11/2001 | Moseley | |
| 2003/0043077 A1 | 3/2003 | Alexopoulos et al. | |
| 2003/0048234 A1 | 3/2003 | Alexopoulos et al. | |
| 2004/0211840 A1 * | 10/2004 | Yogev et al. | 235/491 |
| 2005/0093700 A1 | 5/2005 | Carrender | |
| 2005/0162315 A1 | 7/2005 | Alexopoulos et al. | |
| 2005/0168314 A1 | 8/2005 | Alexopoulos et al. | |
| 2005/0248455 A1 | 11/2005 | Pope et al. | |
| 2005/0280539 A1 | 12/2005 | Pettus | |
| 2005/0285795 A1 | 12/2005 | Puente Baliarda et al. | |
| 2006/0273904 A1 | 12/2006 | Funo et al. | |
| 2008/0035740 A1 | 2/2008 | Tanner | |
| 2010/0321162 A1 * | 12/2010 | Burd et al. | 340/10.1 |

OTHER PUBLICATIONS

Jui-Han Lu, Chia-Luan Tang, Kin-Lu Wong, "Novel Dual Frequency and Broad-Band Designs of Slot-Loaded Equilateral Triangular Microstrip Antennas", 48 IEEE Transactions on Antennas and Propagations 2000, vol. 7, pp. 1048-1054.

Shyh-Tirng Fang, Kin-Lu Wong, Tzung-Wern Chiou, "Bandwidth Enhancement of Inset-Microstrip-Line-Fed Equilateral-Triangular Microstrip Antenna", 34 Electronics Letters 23 1998, pp. 2184-2186.

Greg H. Huff and Jennifer T. Bernhard, "Integration of Packaged RF MEMS Switches with Radiation Pattern Reconfigurable Square Spiral Microstrip Antennas", 54 IEEE Transactions on Antennas and Propagation 2, 2006.

Montesinos, et al, "The Sierpinski Fractal Bowtie Patch: A Multifracton-Mode Antenna", Antennas and Propagation Society International Symposium, 2002, vol. 4, pp. 542-545.

Parron, et al, "Method of Moments Enhancement Technique for the Analysis of Sierpinski Pre-Fractal Angennas", 51 IEEE Transactions on Antennas and Propagation 8, 2003.

O. Petre and H.G. Kerkhoff, "On-Chip Tap-Delay Measurements for a Digital Delay-Line Used in High-Speed Inter-Chip Data Communications", Proceedings of the 11th Asian Test Symposium (ATS'02), IEEE 2002.

V. Subramanian, et al, "Progress towards development of all printed RFID tags: Materials, Processes and Devices," Proceedings of the IEEE, vol. 93, No. 7, pp. 1130-1338, Jul. 2005.

M.D. Balachandran, S. Shrestha, M. Agarwal, Y. Lvov and K. Varahramyan, "Sn02 Capacitive Sensor Integrated with Microstrip Patch Antenna for Passive Wireless Detection of Ethylene Gas," Electronics Letters, vol. 44, No. 7, Mar. 2008.

J.K. Vemagiri, M.D. Balachandran, M. Agarwal and K. Varahramyan, "Development of Compact Half-Sierpinski Fractal Antenna for RFID Applications," Electronic Letters, vol. 43, No. 22, 2007.

G. Marrocco, "Gain-Optimized Self-Resonant Meander Line Antennas for RFID Applications," IEEE Antennas and Wireless Propagation Letters, vol. 2, pp. 302-305, 2003.

K.V. Seshagiri Rao, Pavel V. Nikitin, and Sander F. Lam, "Antenna Design for UHF RFID Tags: A Review and Practical Application," IEEE Transactions on Antennas and Propagation, vol. 53, No. 12, pp. 3870-3876, 2005.

K.V.S. Rao, "An Overview of Backscattered Radio Frequency Identification System (RFID)," Asia-Pacific Microwave Conference Proceedings, APMC, vol. 3, pp. 746-749, 1999.

S. Mukherjee, "Passive Sensors Using RF Backscatter," Microwave Journal, vol. 47, pp. 96-108, 2004.

C. Hausleitner, A. Pohl, M. Brandl, and F. Seifert, "New Concepts of Wireless Interrogable Passive Sensors Using Nonlinear Components," IEEE International Symposium on Applications of Ferroelectrics, Honolulu, HI, pp. 851-854, 2001.

H.T.Su, Y. Wang, F. Huang, and M.J. Lancaster, "Wide-band Superconducting Microstrip Delay Line," IEEE Transactions on Microwave Theory and Techniques, vol. 52, pp. 2482-2487, 2004.

S.R. Best, "Shunt-stub Line Impedance Matching: A Wave Reflection Analysis Tutorial," IEEE Antennas and Propagation Magazine, vol. 44, pp. 76-86, 2002.

H. A. Wheeler, "Reflection Charts Relating to Impedance Matching," IEEE Transactions on Microwave Theory and Techniques, vol. MTT-32, pp. 1008-1021, 1984.

A. Chamarti and K. Varahramyan, "Transmission Delay Line Based ID Generation Circuit for RFID Applications," IEEE Microwave and Wireless Components Letters, vol. 6, No. 11, pp. 588-590, 2006.

U.K. Dandgey, "Design and Development of a Microstrip Meanderline Antenna for an RFID-Based Passive Wireless Sensor Platform," M.S. Thesis, Louisiana Tech University, Ruston, 2005.

* cited by examiner

Fig. 1: Schematic diagram of passive RFID system. Prior Art

Fig. 2

Figure3: Binary code generation by the superimposition of delayed signals

Fig. 5: Pulse reflections in two open terminated transmission lines.

Fig. 9: Phase Modulation Scheme

Fig. 10: Reflection pattern representing phase modulated signal pattern.

Fig. 15: Mask layout with different RFID and RFID-based sensor configurations

TRANSMISSION DELAY BASED RFID TAG

This application claims the benefit under 35 USC §119(e) of U.S. provisional application Ser. No. 60/827,249 filed Sep. 28, 2006 which is incorporated by reference herein in its entirety.

This invention was developed at least in part through the use of federal funding from grant no. DARPA N66001-05-8903 and the federal government may retain certain rights in this invention.

FIELD OF INVENTION

The present invention relates broadly to Radio Frequency Identification (RFID) tags and systems for implementing the same. In particular embodiments, the invention relates to passive RFID systems based upon signal propagation delays.

BACKGROUND OF INVENTION

Figure 1:
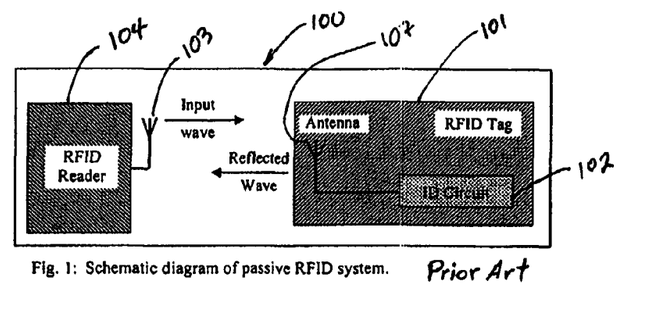
FIG. 1 is a schematic view a basic RFID tag system.

RFID has been a key technology for short range wireless auto identification. It has been implemented in many recent technologies such as contact-less smart cards, access control, wireless sensing and information collection, industrial automation, ticketing, public transportation, automatic toll collection, animal and product tracking, and medical applications. Referring to FIG. 1, a typical RFID system 100 consists of two major blocks: an interrogator, known as RFID reader 104, and a remote unit, known as RFID tag 101. The tag has a unique identification code incorporated into the ID circuit 102 and this code becomes associated with the object to which the RFID tag is attached. The RFID reader 104 normally has a transmitter/receiver unit which transmits a signal to and receives a response from the RFID tag. The RFID tag will have an antenna 103 and the RFID reader will have an antenna 107. Unlike barcode technology, an RFID tag can convey more extensive information about the object. The reader sends an interrogation signal and the tag responds with the information stored in it. A RFID system does not require line of sight, and information can be read from comparatively longer distances than bar code scanners. Moreover, multiple tags can be read simultaneously.

RFID tags can be classified as active, reader powered tags (inductive coupling) and fully passive tags. Active tags require power source to operate, therefore are limited by their battery life. Reader powered tags operate by inductive coupling; therefore they are limited by read distance. On the other hand, passive tags consist primarily of an antenna and an ID circuit. They do not require any power supply and work by responding to reader interrogation by changing certain parameters of the interrogation signal. Passive tags tend to be more limited by their read distance and the amount of information that they can convey.

SUMMARY OF SELECTED EMBODIMENTS OF INVENTION

One embodiment of the present invention includes a chipless RFID tag system. The system includes a transmitter sending an input signal and a tag substrate having a first and a second microstrip. The second microstrip is at least twice as long as the first microstrip and has substantially uniform impedance along its length. The system further includes at least one tap positioned between the first and second microstrips allowing one-way transmission of the input signal from the second to the first microstrip.

Another embodiment of the present invention includes a chipless RFID tag system. This system includes a transmitter sending an input signal and a tag substrate. The tag substrate has at least one microstrip and the microstrip has a first portion with a first impedance and a second portion with a second impedance different from the first impedance. The system further includes a receiver detecting at least two reflections from an interface of the first and second impedances and identifying relative time domain positions of the reflections to one another.

DETAILED DESCRIPTION OF SELECTED EMBODIMENTS

Figure 2:
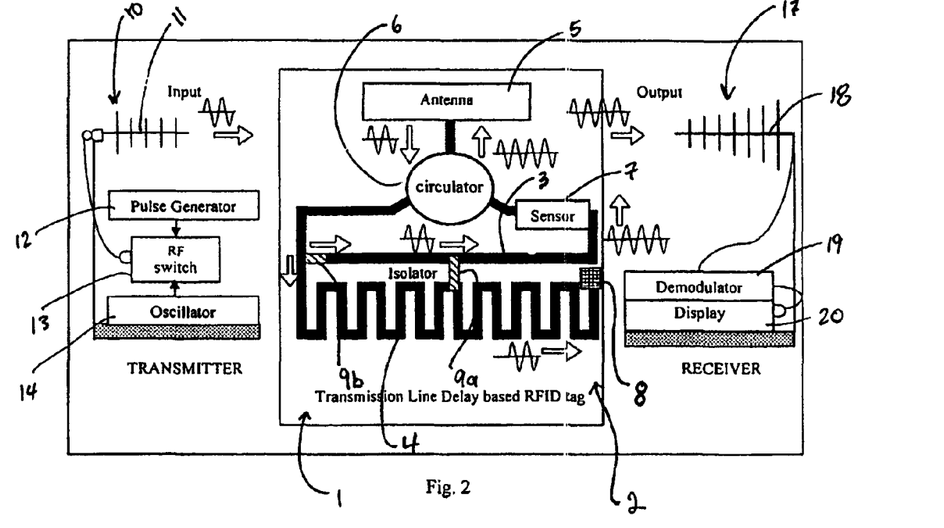
FIG. 2 illustrates one RFID tag embodiment of the present invention.

FIG. 2 is a schematic illustration of one embodiment of the RFID tag system of the present invention. FIG. 2 shows three basic components of the system, transmitter circuit 10, receiver circuit 17, and RFID tag 1. In this particular embodiment, transmitter circuit 10 includes a oscillator 14, an RF switch 13, a DC supply and a pulse generator 12. Oscillator 14 supplies a carrier frequency (as a nonlimiting example, at 915 MHz) to the input of RF switch 13. The power needed by RF switch 13 is provided by the DC power supply. The on and off duration of RF switch 13 is controlled by supplying a pulse from pulse generator 12. The output of RF switch 13 is fed to the transmitting antenna 11. This embodiment of transmitter circuit 10 produces a train of sinusoidal signals in a conventional on/off key (OOK) coding. However, the invention is not limited to signals using OOK coding nor the transmitting circuitry seen in FIG. 2. Any conventional or future developed transmitting circuitry could be employed together with any coding scheme which generally accomplishes the functions described below.

This embodiment of receiver circuit 17 includes an antenna 18, a demodulator 19, and a display 20. In the receiver circuit the demodulator receives the signal from the antenna and demodulates the signal to extract the ID code of the tag, which can then be viewed by the display. The demodulator consists of a low noise amplifier, a local oscillator, a mixer, a band pass filter, an analog to digital converter, and a single board computer. With the carrier signal from the local oscillator, the demodulator demodulates the received signal. The band pass filter blocks high and low frequency components while allows a low attenuation path for the selected signal. The analog to digital converter converts the analog signal to binary form and feeds it to the single board computer. Based on information loaded in the memory of single board computer, the computer performs the further processing of the signal and decodes the ID code generated by the tag. The ID code generated is displayed on the display system. Although illustrated separately in FIG. 2, it will be understood that transmitter circuit 10 and receiver circuit 17 are the equivalent of the RFID reader 104 seen in FIG. 1. Likewise, there are many ways in which the transmitter/receiver circuitry could be constructed; for example, a single transceiver versus separate transmitter/receiver circuit as suggested by the RFID reader 104, where a single antenna is shared by both transmitting and receiving system isolated by a circulator.

The RFID tag 1 seen in FIG. 2 generally comprises antenna 5, circulator 6, sensor 7, a first conductive microstrip 3 and a second conductive microstrip 4, all positioned on a substrate 2. Microstrips 3 and 4 are generally conductive transmission lines formed on the generally insulating surface of substrate 2. The formation of microstrips 3 and 4 will be described in more detail below, but in the embodiment of FIG. 2, microstrips 3 and 4 have substantially uniform impedance along their lengths and substantially uniform capacitance and inductance properties along their lengths. Microstrip 3 in FIG. 2 is a generally straight trace whose length approximates the width of tag substrate 2, while microstrip 4 is a considerably longer trace which takes on a meandering path in order to accommodate its length on substrate 2. In the embodiment of FIG. 2, microstrip 4 is at least twice as long as microstrip 3. The characteristic impedance, $Z_o$, and the transmission time delay, $T_d$, associated with the microstrips are given by:

$$Z_o = [L/C]^{1/2}$$

$$T_d = [LC]^{1/2}$$

where time delay in the microstrip transmission line is constant per unit length and is distributed uniformly along its length.

Microstrip 4 is shown as terminated by resistor 8, which has an impedance that is substantially equal to the characteristic impedance $Z_o$ of microstrip 4 in order to minimize signal reflections from the terminating end of microstrip 4. FIG. 2 also shows "taps" 9 positioned between microstrips 3 and 4. In this embodiment, taps 9 are RF isolators such as a model CES 40925MECB000RAB, provided by Murata Electronics North America, Inc. of Smyrna, Ga. The RF isolators are two-port units that allow signals to pass in one direction while providing high isolation for reflected energy in the reverse direction. Isolators are used to allow the delayed signal to flow to the common point or trace in the ID generation circuit and not vice versa. Thus a signal traveling down microstrip 4 will be transmitted to microstrip 3 when the signal encounters tap or isolator 9a. Likewise, an input signal entering microstrip 3 through isolator 9b will not have its reflection (e.g., from sensor component 7) travel back to microstip 4. Naturally RF isolators are just one form of tap and any conventional or future developed component that can effect such one way signal transmission should be considered within the scope of the present invention.

Figure 3A:
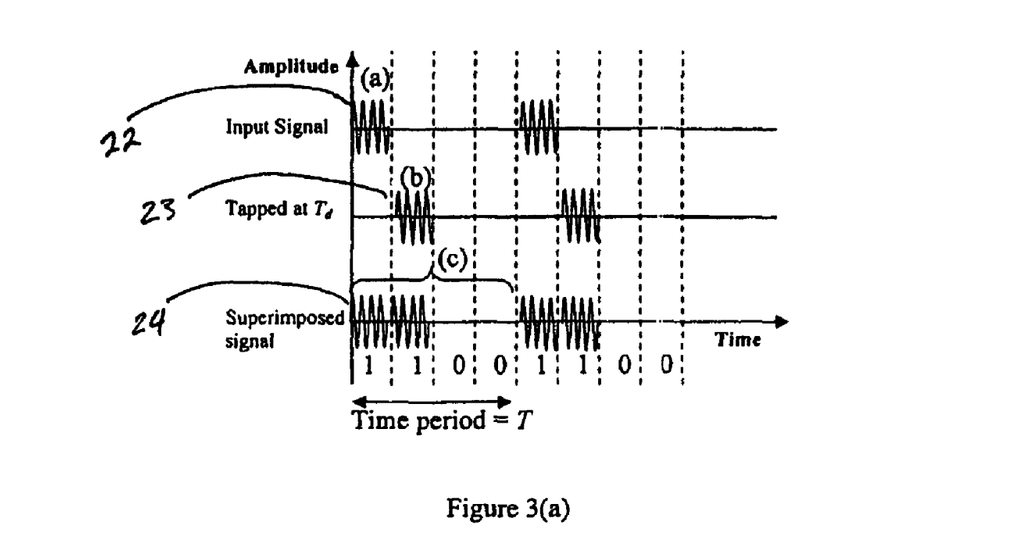
FIG. 3 a signal pattern from the RFID tag seen in FIG. 2.

FIG. 2 also illustrates a circulator 6 and a sensor 7 interconnected with the microstrips 3 and 4. In the most general terms, sensor 7 acts to allow a signal to be transmitted from microstrip 3 to circulator 6 given the presence of a certain condition (e.g., a threshold temperature, presence of a particular compound, etc.) and will be described in greater detail below. Circulator 6 is a passive device that is used to control the propagation of RF signals. RF circulators typically have three or more ports and are used to control the direction of signal flow in a circuit. They allow the signal entering one port to pass to an adjacent port in either a clockwise or counter-clockwise direction, but not to any other port. A three port or Y junction circulator is shown in FIG. 2 and the signal flow is normally expressed as 1 to 2, 2 to 3 and 3 to 1. The circulator allows a low attenuation path from port 1 to port 2, and a high attenuation path from port 1 to port 3, thus having the signal going through path 1 to 2, and not to 3 from 1. Subsequently it will allow the signal to go from port 2 to 3 (low attenuation path), but not 2 to 1 (high attenuation path). In one embodiment, the circulator is a MAFRIN0497 available from Richardson Electronics of LaFox, Ill. In operation, the embodiment of FIG. 2 will have transmitter circuit 10 send a short train of sinusoidal waves which may be interpreted as an OOK modulated input signal. The signal propagates very quickly through the shorter microstrip 3, and assuming sensor 7 is activated and circulator 6 is in the proper position, the signal will be re-transmitted at antenna 5 and received by receiver circuit 17 (see input signal (a) in FIG. 3a). On the other hand, there will be a delay in the re-transmission of the signal passing through the longer microstrip 4. When the signal reaches tap 9a, the signal is able to travel down the shorter microstrip 3 and be re-transmitted by antenna 5 to receiver circuit 17. Signal (b) in FIG. 3a illustrates the time domain position of this delayed signal relative to the input signal (a). When signal (a) and (b) are superimposed on one another, a signal trace (c) is constructed to represent a binary code. For example, in signal trace (c), a signal of sufficient amplitude in a particular time slot will be considered a "1", while a signal of insufficient amplitude in a particular time slot will be considered a "0." It can be seen that the signal produced by the microstrip arrangement in FIG. 2 produces a four bit binary code of "1 1 0 0."

Figure 3B:
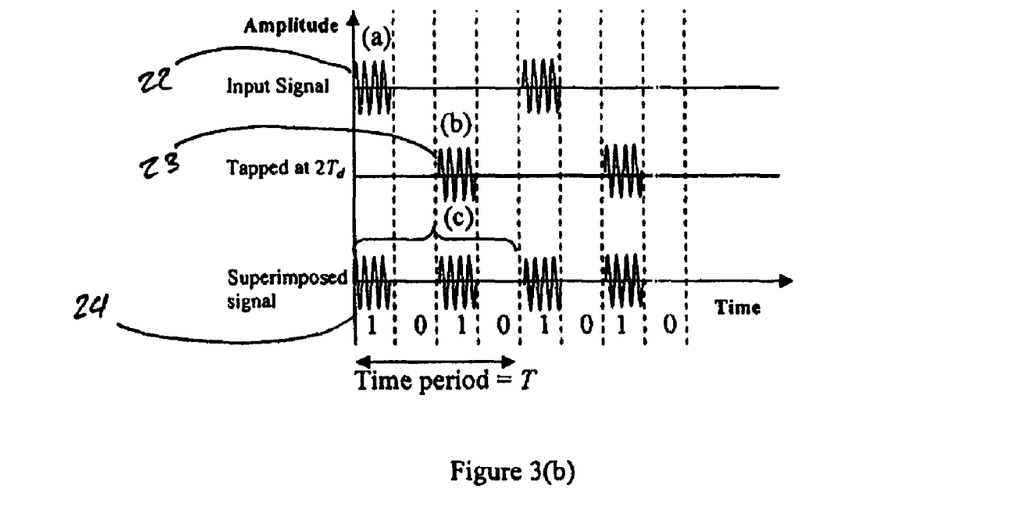
Figure 3C:
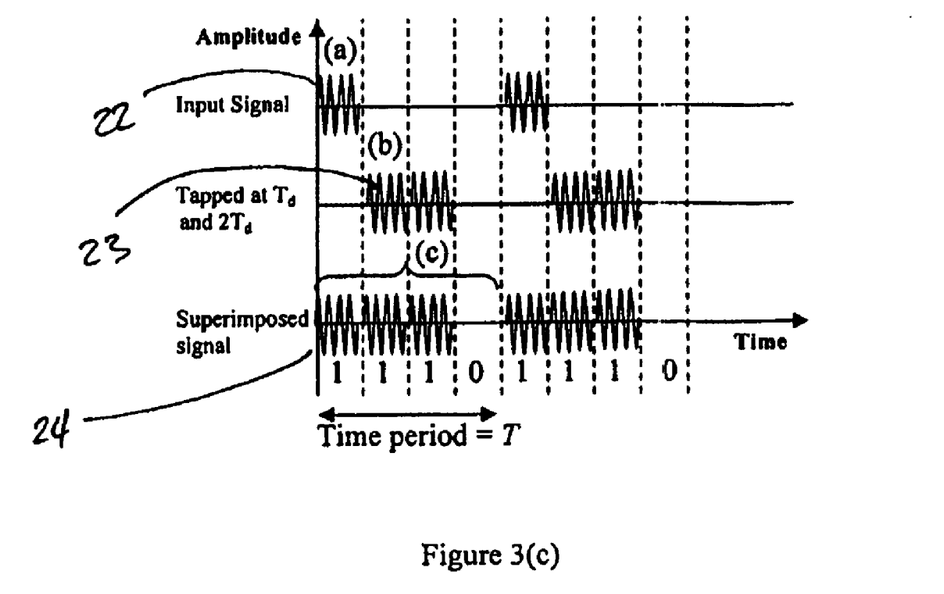

In this embodiment, the code may be altered by altering the position and/or number of taps 9. For example, if tap 9a in FIG. 2 is moved to the right, there would be a greater time delay for signal (b). A signal pattern such as seen in FIG. 3b would result, giving the code "1 0 1 0." Or if a second tap is place to the right of the tap 9b, a signal pattern such as seen in FIG. 3c would result, giving the code "1 1 1 0." In this manner, the code could be altered to any one of 8 combinations. Furthermore, additional bits could be added to the code by methods such as introducing additional microstrips or by increasing the number of taps, increasing the length of line or reducing the pulse width.

Figure 4:
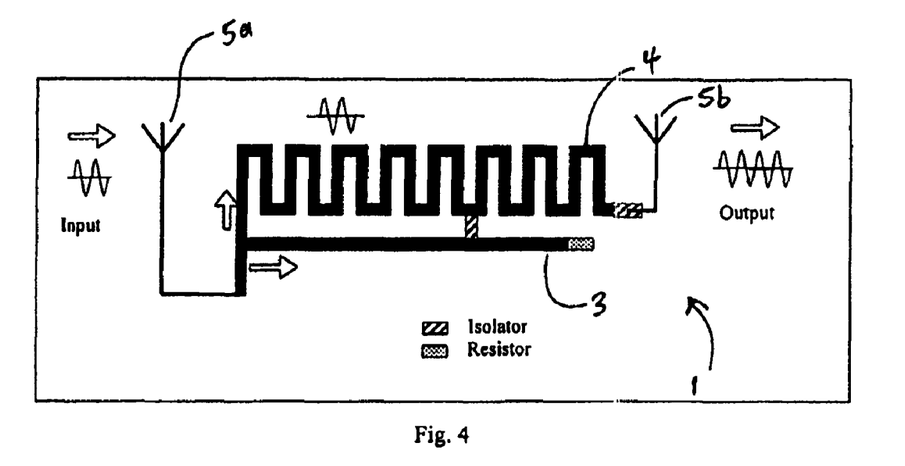
FIG. 4 illustrates a slight modification of the RFID tag embodiment of seen in FIG. 2.

Although FIG. 2 illustrates microstrip 4 as a meandering trace, this is largely done to accommodate the longer overall transmission line on a smaller substrate so the tag has the smallest practical foot print. However, where tag size is not as important, alternate embodiments could include a straight microstrip 4 which is substantially longer than microstrip 3. Another alternative embodiment of RFID tag 1 is seen in FIG. 4. In this embodiment, the circulator 6 and sensor 7 has been eliminated. Rather than a single antenna having a circulator to control when the antenna is transmitting or receiving, the RFID tag 1 in FIG. 4 has a receiving antenna 5a and a separate transmitting antenna 5b. This has the advantage of not requiring a circulator, but also the disadvantage of requiring addition substrate space to accommodate two antennas. Additionally, while the embodiments described above show a common input junction for the two microstrips, alternative embodiments could be fabricated without a common input junction. However, not having a common input junction could require each microstrip to have its own antenna (again a somewhat inefficient use of substrate space).

The sensor 7 in FIG. 2 may be used to detect virtually any condition. For example, the sensor could detect temperature, pressure, light, the presence of a particular compound, or any other condition or state which requires detection. The mechanism of the sensor could likewise be based on a wide range of sensor technologies. As nonlimiting examples, the sensor could be actuated by a change in one or more of the dielectric, electrical, mechanical, chemical, optical, or biological properties of the sensor.

In many embodiments, it is desirable that the sensor consumes low power (e.g., few microwatts) or self-generates the power needed. Solar cells, piezoelectric and pyroelectric materials generate energy and can be used to turn on a switch such as a FET. Materials like quantum tunneling composites and polyaniline (PANI) change from insulating state to conducting state nonlinearly when the sensed quantity reaches a threshold value. Where no battery is intended in the proposed design, the sensor switch will operate either on its own with the generated energy or in a passive mode. Quantum Tunneling Composite (QTC), polyvinylidene fluoride (PVDF) and PANI are example materials which can achieve these characteristics.

In certain embodiments, the sensor simply acts as a switch in series with other elements in the RFID tag. Any material that has a non-linear behavior and has the capability to stand alone can be considered for the switch. The sensor switch is an interface between the sensor element and the RF path of the RFID circuit. Examples of different types of sensing material employable in the current RFID-based sensors include the QTC, PVDF and PANI materials mentioned above.

For QTC materials, the resistance changes exponentially under pressure making it suitable for use as a switching element for pressure sensing. In QTC materials, the metal particles are separated by a polymer lattice and never come into physical contact. They move very close under pressure and Quantum Tunneling occurs between the metal particles which are now separated by quantum scale distances. Moreover, QTC material can be effectively modeled as an RF resistor switch because it is known to conduct high frequency signals.

Piezoelectric materials such as PVDF generate a charge when a pressure is applied. The charge developed can be converted into a voltage if a capacitor structure is used with PVDF between its electrodes. The charge developed is due to the aligning of the dipoles in the material and this polarization occurs only in the area where pressure is applied. The charge disappears once the pressure is removed and the material acts as any other dielectric material. These materials are not as good as current sources but are quite good voltage sources.

Certain types of polyaniline change their conductivity exponentially when they detect acidic fumes such as those that emanate from fruit and vegetable spoilage. Thus, polyaniline can be used to detect the freshness of the fruit, if appropriately designed.

Still further embodiments of the RFID tag 1 will employ a transmission reflection to generate an identification signal. A pulse signal, reflected from an unmatched transmission line termination is delayed in time with respect to the input pulse due to the inherent signal propagation delay. In a multiple transmission line system (FIG. 5 discussed below) or step impedance transmission line system (FIG. 7 discussed below), a number of delayed reflected pulses appear at the input terminal due to multiple reflections inside the transmission line. The number of reflections depends on the number of transmission lines or number of impedance steps, while the delay depends on length. By proper design of the transmission line system, reflected pulses can be placed at any desired position to form a predefined signal pattern that represents a unique ID code.

When the impedances of transmission line and load are not matched, not all the signal power flowing through the transmission line is delivered to the load, and some part is reflected back to the signal input point. The magnitude of the reflection depends on the magnitude of the impedance mismatch, as characterized by the reflection coefficient, $\tau$, where:

$$\tau = \frac{Z_L - Z_T}{Z_L + Z_T}$$

$$|\tau| = 1 \text{ for } Z_L = 0, \text{ or } Z_L \gg Z_T$$

where, $Z_T$ and $Z_L$ are the transmission line characteristic impedance and load impedance, respectively. If a sinusoidal pulse signal is fed at one end of a transmission line, denoted as the input port, with the other end open, the pulse flows from the input to the open end and gets reflected at the termination. As a result, an attenuated and delayed reflected pulse appears at the input end of the transmission line. The phase of the reflected pulse is the same as the input pulse if $\tau$ is positive, and the phase is opposite if $\tau$ is negative.

One example of a multiple transmission lines ID generation design consists of ground or open terminated transmission lines with common feed point. The number, lengths and terminations of the transmission lines are designed such that the reflection pattern forms a composite signal that follows a predefined digital modulation scheme and represents a unique ID code. The first three reflections, consisting of two primary reflections from the two lines and the third due to superposition of the two secondary reflections, are used for ID code generation. The relative positions of the reflected pulses depend on the delay and therefore the lengths of the transmission lines. OOK or phase modulated signal patterns can be generated by designing appropriate placement of reflected pulses.

Figure 5:
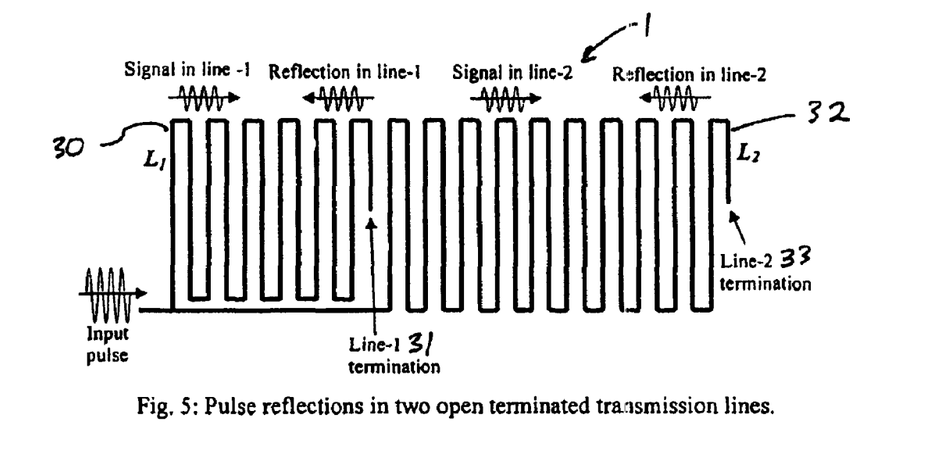
FIG. 5 illustrates another RFID tag embodiment of the present invention.

Referring to the example circuit shown in FIG. 5, in this embodiment (with antennas excluded for clarity), the RFID tag comprises at least two microstrips or transmission lines 30 and 32. If a pulse signal is fed to the RFID tag configuration and the two transmission lines are open (or ground) terminated (terminations 31 and 33), the input signal travels in both transmission lines and eventually gets reflected at the terminations 31 and 33, thus producing two delayed reflected pulses at the input port. The positions of the reflected pulses depend on the length of the respective transmission lines. In addition, the reflection from one transmission line (30) serves as the secondary input pulse for the other line (32). Therefore, a secondary reflected pulse follows the two initial reflected pulses. Thereafter, this secondary reflection serves as input for tertiary reflections and so on. The amplitude of the successive reflected pulses diminishes as reflected signals divide at transmission line branches and also due to transmission line losses. The same principles apply for a system of three or more transmission lines.

Figure 6:
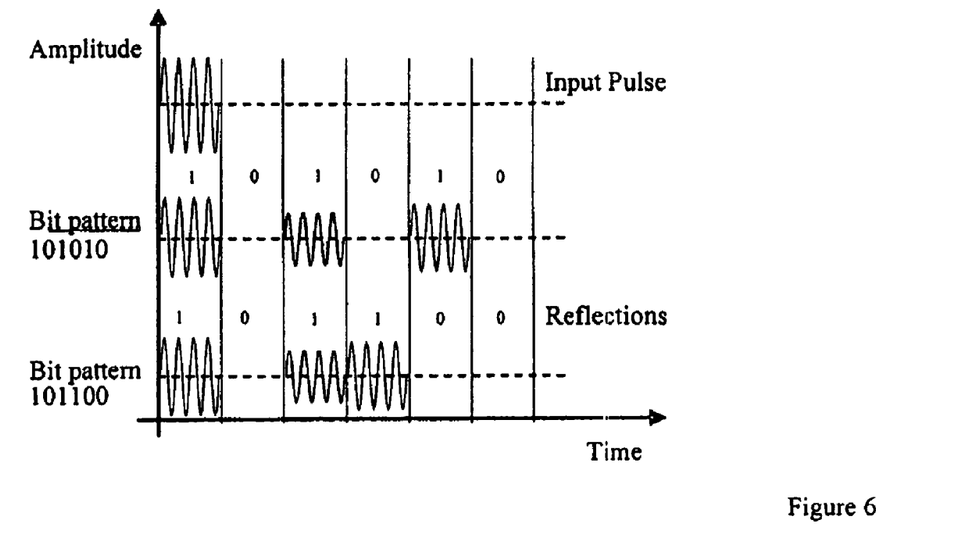
FIG. 6 illustrates a signal pattern from the RFID tag seen in FIG. 5.

Dual transmission lines ID circuits such as FIG. 5 consist of different combinations of two transmission line lengths to construct OOK modulated signal patterns. FIG. 6 schematically illustrates two different OOK modulated signal patterns representing 101010 and 110100 bit patterns, constructed by placing three reflected pulses in six bit positions. Practically, consecutive reflected pulses are more attenuated than shown in the FIG. 6, and higher order reflections are not considered for code generation, limiting the use of only the first three pulses. However, detection of higher order reflections depends largely on the sensitivity of electronics and the complexity of signal processing systems, particularly relative to future developed electronics and signal processing. Thus, codes generated with higher order reflections are within the scope of the present invention.

The presence of a pulse represents binary 1 and its absence represents binary 0. With this representation, ten different OOK modulated signal patterns, representing ten different ID codes can be constructed. In this embodiment, only three 1s are considered in any sequence for code generation. If n positions are considered with three reflected pulses, taking the first bit as a starting bit, (n−2)×(n−1)/2 bit sequences can be constructed, where n is greater than or equal to the number of reflected pulses (in this case we have three reflected pulses). For n positions, to get the maximum number of ID sequences, the number of reflected pulses, here defined as I, is given by I=n/2 when n is even, and it is given by I=(n+1)/2) when n is odd.

For any bit pattern, the length of the first or shorter transmission line ($L_1$) and that of the second or longer line ($L_2$) are given as:

$$L_1 = (i' - i) \times T \times l$$

$$L_2 = (i' - 1) \times T \times l$$

where i and i' are the numbers representing the position of the second and the third pulses, respectively. The length of transmission line required for 1 ns reflection delay/is in millimeter, and the bit width T is in ns. For six bits design, i can take 2 through 5 while i' can take 3 through 6. (4) and (5) are true for any number of bits, as long as the ID circuit consists of two transmission lines and three pulses are considered. For 101010 bit pattern, i=3, and i'=5. Taking bit width, T=3.4 ns and l=90 mm/ns, (4) and (5) give $L_1$=612 mm and $L_2$=1224 mm. Ansoft planar design of the ID circuit is shown in FIG. 5. For 101100 bit pattern, lengths of lines $L_1$ and $L_2$ are 306 mm and 918 mm, respectively.

Figure 7:
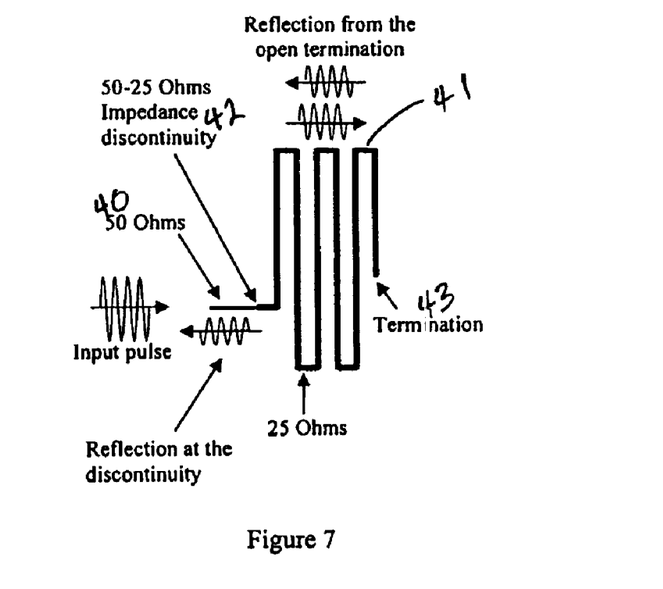
FIG. 7 illustrates a still further RFID tag embodiment of the present invention.
Figure 8:
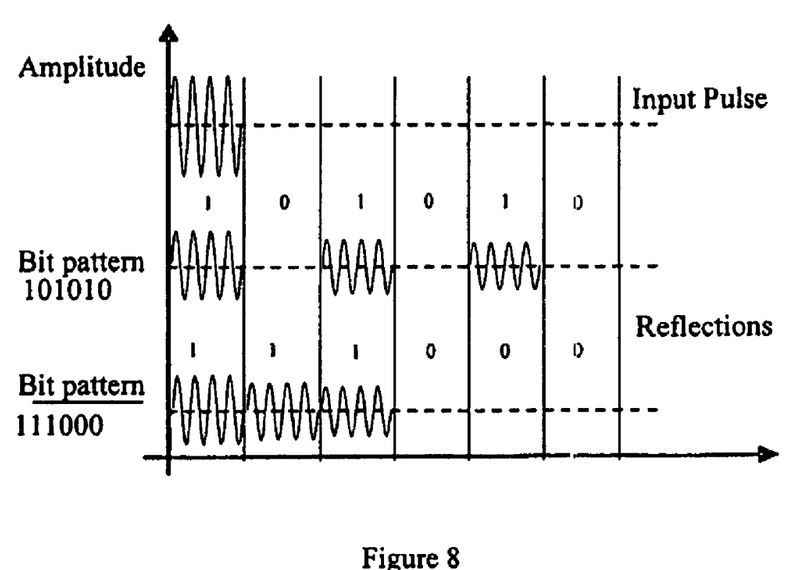
FIG. 8 illustrates a signal pattern from the RFID tag seen in FIG. 7.

FIG. 7 illustrates the concept of a step impedance tag circuit consisting of a transmission line with a step impedance. Although FIG. 7 only shows one step impedance line, it will be understood that the present invention also includes multiple step impedance lines. With an appropriate selection of transmission line widths and lengths, reflected pulses of proper phase can be placed at any desired position to construct OOK or phase modulated signal patterns. FIG. 7 shows a step impedance transmission line having a 50 ohms line 40 followed by open (or ground) terminated 25 ohms line 41. If a pulse signal is fed to a step impedance transmission line, as shown in FIG. 7, a third of the signal voltage is reflected at the 50-25 ohms interface 42. The transmitted signal power is finally reflected back from the open termination 43. Some part of backward traveling signal is again reflected at the 25-50 ohms interface. The same phenomenon continues and multiple reflections occur inside the line such that a number of reflected pulses, delayed in time, appear at the input port. As the impedance of a microstrip transmission line for a given substrate depends on its width, a varying impedance microstrip transmission line can be obtained by simply varying width along the length of the line, as suggested in FIG. 7.

The ID circuits are designed by considering the first three reflected pulses. As one example, an ID circuit with a 5 mm long 50 ohm transmission line, followed by a 612 mm long 25 ohm open transmission line, creates a series of reflected pulses separated by 3.4 ns. The reflection pattern represents an OOK modulated 101010 bit pattern with 3.4 ns bit width. The design is based on 1 ns delay for a 90 mm long transmission line. As another example, an ID circuit with a 5 mm long 50 ohms line followed by a 306 mm long 25 ohms open transmission line places the first three pulses reflections in a sequence resembling a 111000 bit pattern in a six bit representation.

Figure 9:
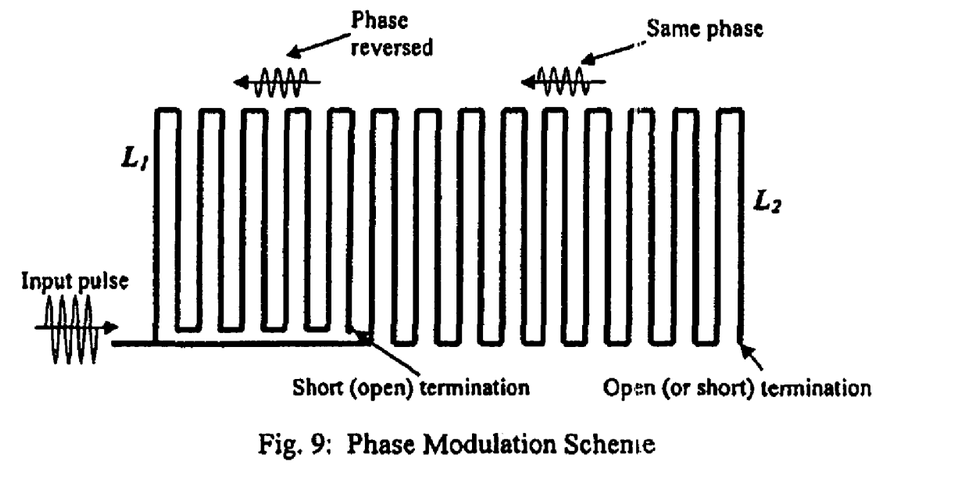
FIG. 9 illustrates a phase modulation RFID tag embodiment.

In the RFID tag embodiment shown in FIG. 9, the second line ($L_2$) is twice as long as first ($L_1$). The first line has short (or open) termination and the second line has an open (short) termination. The reflection from the shorted line is reversed (opposite phase compared to input) while the reflection from the open line has same phase as the input. The secondary reflection will have an opposite phase if one line is short and another line open, because the reflection travels through both the lines, thus encountering the open termination once, where no phase change occurs, and the short termination once, where the phase is reversed, thereby making overall phase opposite compared to the input. The secondary reflection will have same phase if both the lines are either short or open. The consecutive pulses are delayed in the time domain due to propagation delay in the transmission lines. The length of $L_1$ and $L_2$ are designed such that a succeeding pulse is placed just next to the preceding pulse.

Figure 10:
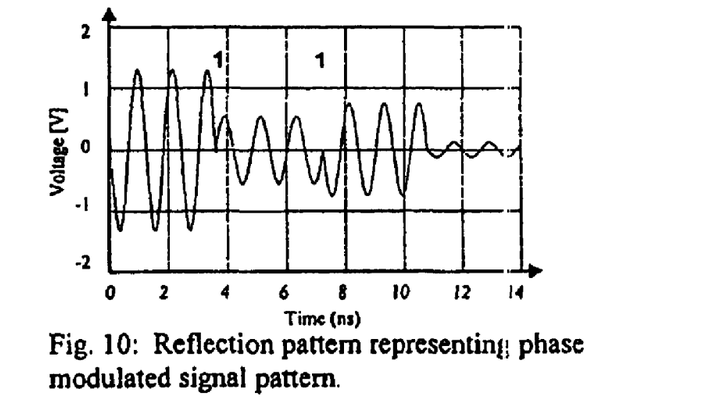
FIG. 10 illustrates a signal pattern from the RFID tag seen in FIG. 9.

The receiver is designed to detect a phase change in the incoming reflected pulses. A reverse phase is detected as "1" and the absence of phase change is detected as "0". For the tag embodiment shown in FIG. 9 with the first line shorted and the second line grounded, the phase modulated output pattern will appear as shown in FIG. 10. In this signal trace, it can be seen that there are two phase reversal in the signal pattern, thereby representing a two bit code 11. If the first line were open and second line were ground, it would represent 10, alternatively 01 for both lines shorted, and 00 for both lines open.

As discussed above, the RFID tags typically require at least one antenna. The antenna serves as the transducer between the controlled energy residing within the system and the radiated energy existing in free space. One type of antenna well suited for UHF RFID applications is the non-meandered monopole antenna. Described below are three non-meandered monopole antenna embodiments, each occupying less than 30 cm$^2$ in area. Theses three antennas are the inset-fed triangular patch antenna (FIG. 12), the one arm Archimedes spiral antenna (FIG. 13), and the Half-Sierpinski fractal antenna (FIG. 14). The first two antennas display peak gains of over 2 dBi and the third one has a gain close to 0 dBi. The return-loss of all three antennas is less than −10 dB at the ISM frequency band of 915 MHz. With small length to width ratios, these antennas have certain advantages over the ubiquitous meandered dipole antenna which is often used for RFID applications. In the illustrated embodiment, the antennas are designed for a flexible polyimide platform and can be considered for applications such as the tagging of small-size consumer products.

Figure 11:
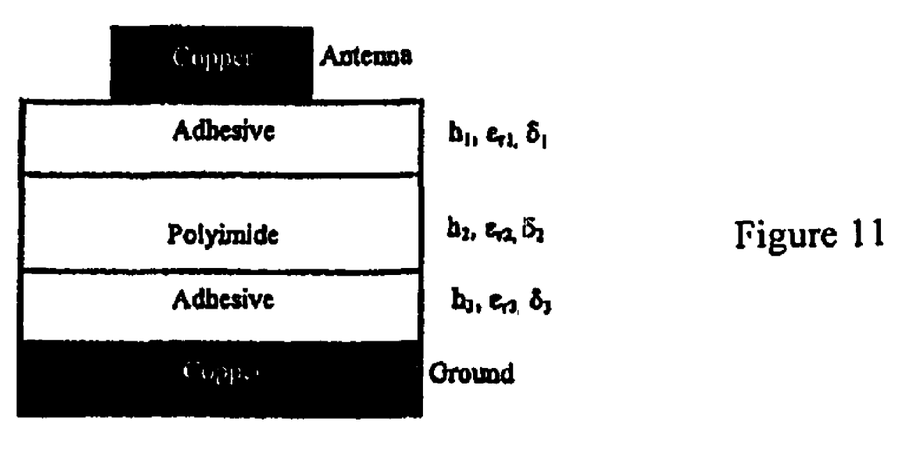
FIG. 11 illustrates a cross-section of one planar antenna embodiment.

Presently, meandered antennas are commonly used for UHF RFID applications. However, the generally large dimensional length to width ratio of the meandered antenna structure makes this type of antenna disadvantageous for use in RFID tags requiring small dimensional length to width ratio. Typical length to width ratios of meander antennas currently reported and tested are of the order of 5/1. It would be advantageous to employ an antenna which occupies less surface area than the previously reported meandered dipole antenna, is planar in nature, is developed on a single flexible polyimide substrate, and is designed for high-gain performance. All the antennas described below have a small length to width ratio compared to the meandered dipole antenna. The antennas shown are designed for 915 MHz frequency and having an output impedance of 50 Ohm. The substrate topology employed in the design and fabrication of the antennas is shown in FIG. 11. FIG. 11 illustrates a cross-section of the antenna substrate having h1=h3=25 μm, h2=127 μm; ∈r1=∈r3=3.3, ∈r2=3.5; δ1=δ3=0.027, δ2=0.008.

Figure 12A:
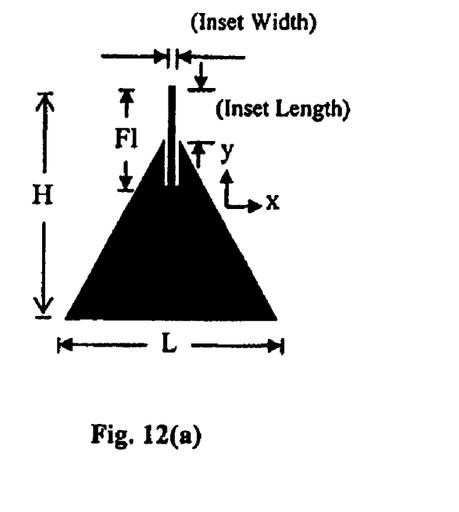
FIG. 12 illustrates one triangular patch antenna embodiment.
Figure 12B:
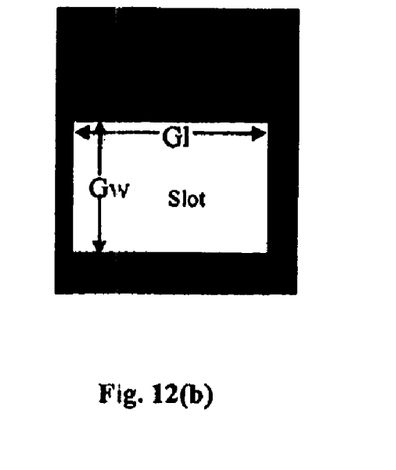

FIG. 12 illustrates an inset-fed triangular patch antenna designed on the platform seen in FIG. 11. The impedance of the antenna is matched to 50 ohms by adjusting the inset-length and width. To increase the gain of the antenna, a slot is created on the ground plane. The dimensions of the slot are varied to increase the gain of the antenna. The surface area occupied by this antenna is 15 cm². In this embodiment, FIGS. 12(*a*) and 12(*b*) represent patch and ground layouts of the inset-fed triangular patch antenna, having the dimensions H=5.54 cm, L=5.34 cm, F1=2.33 cm, Iw=0.15 cm, Il=1.07 cm, Gl=6.09 cm, Gw=5.19 cm.

Figure 13A:
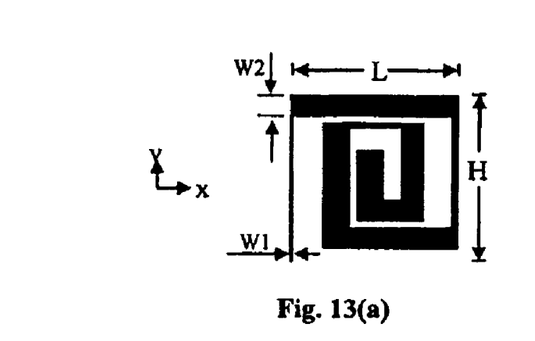
FIG. 13 illustrates one spiral patch antenna embodiment.
Figure 13B:
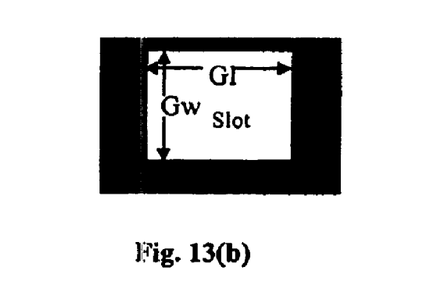

FIG. 13 illustrates an eleven-segment single arm Archimedes spiral developed for the platform seen in FIG. 11. The widths of the spiral arm are varied to match the antenna to 50 ohms impedance. A slot is introduced in the ground plane to increase the gain of the antenna. FIG. 13(*a*) shows the design of the spiral patch antenna and FIG. 13(*b*) shows the patch-aligned underlying ground layer. Example dimensions for one embodiment of the spiral patch could be w1=1 mm; w2=8 mm; w3=2 mm; w4=8 mm; w5=8 mm; w6=2 mm; w7=7 mm; w8=8 mm; w9=8 mm (widths of the spiral arms inward); H=6.0 cm, L=5.0 cm, Gl=5.4 cm, Gw=5.7 cm. The surface area occupied by this antenna is 30 cm².

Figure 14A:
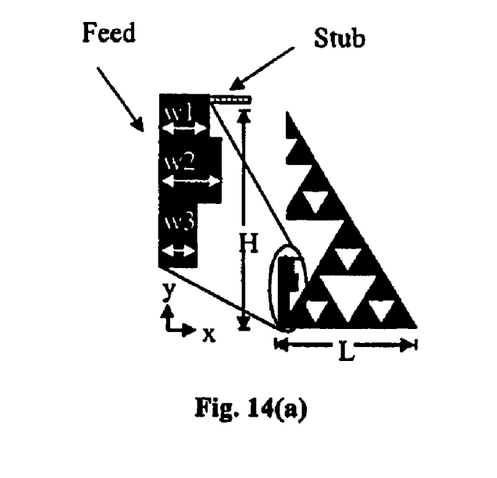
FIG. 14 illustrates one half-Sierpinski patch antenna embodiment.
Figure 14B:
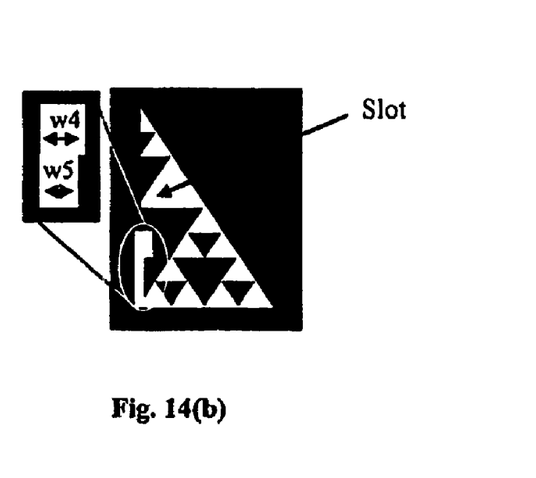

FIGS. 14(*a*) and 14(*b*) illustrate a Half-Sierpinski antenna which is derived from the Sierpinski Monopole to capture the multi-resonant properties of the Sierpinski monopole at a smaller size than the parent version. The surface area occupied by this example antenna is 9.5 cm². The impedance of the antenna is matched to 50 ohms by varying the widths of the feed of the antenna and by introducing a stub which is grounded at one end at the feed of the antenna. The stub is grounded at one end to reduce the length of the stub that is to be added to the antenna to match the impedance of the antenna to 50 ohms. The width of the stub is 0.4 mm and the length is about 2 mm. The gain of the antenna is increased by modifying the slot size in the ground plane. Example embodiments for one embodiment of the patch and ground layouts (FIGS. 14(*a*) and 14(*b*)) are H=5.7 cm, L=3.3 cm, w1=0.25 cm, w2=0.35 w3=0.15 cm, w4=0.35 cm, w5=0.15 cm.

Figure 15:
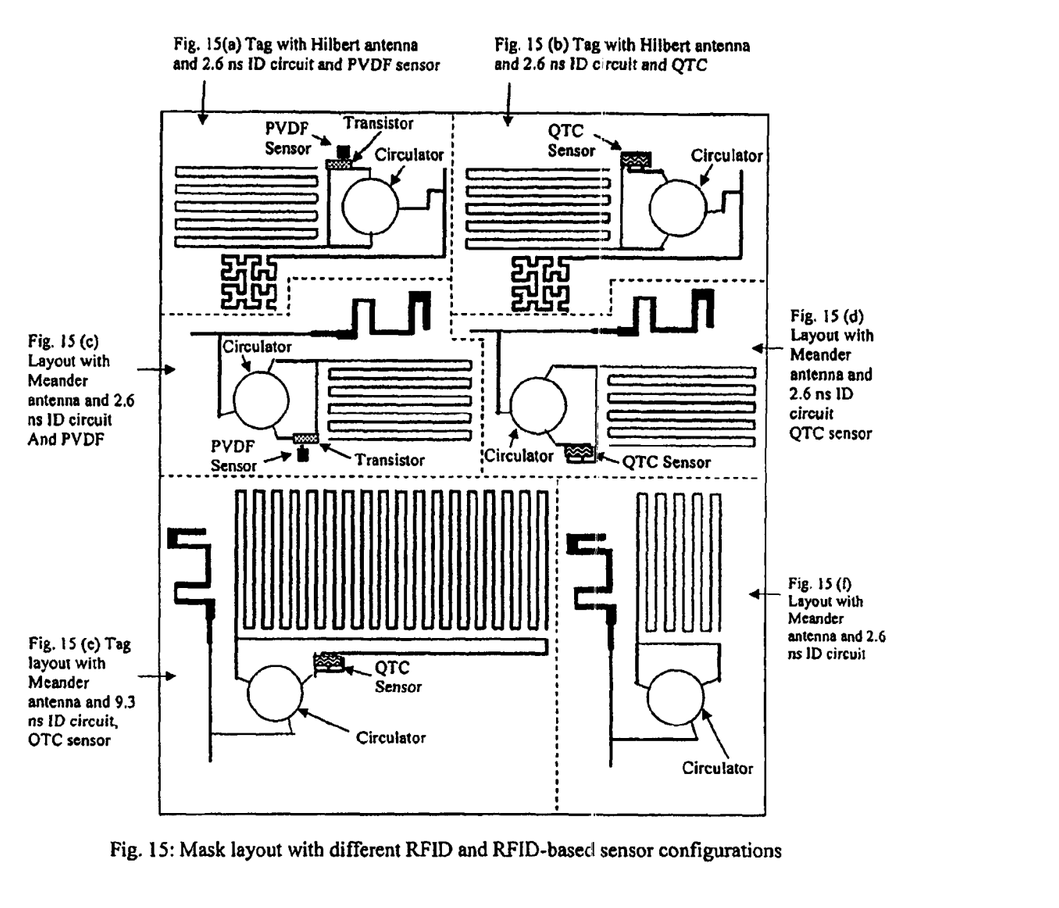
FIG. 15 illustrates various meander and Hilbert antenna embodiments.

Although the above describes three antenna designs well suited to RFID tags, many other antennas may be employed in the present invention, nonlimiting examples of which include Meander and Hilbert antennas such as seen in FIG. 15. Moreover, the present invention could include any other conventional or future developed antennas fulfilling the required functions of the RFID tags described above.

The present invention include many embodiments not necessarily shown in the figures. Certain example embodiments could include:

Embodiment A: A chipless RFID tag comprising:
a. a flexible substrate;
b. a first elongated conductive microstrip formed on the substrate; and
c. a second elongated conductive microstrip formed on the substrate, wherein the second microstrip has a meandering path which is at least twice the length of the first microstrip.

Embodiment A1. The chipless RFID tag according to embodiment A, wherein the first and second microstrips have a common input port.

Embodiment A2. The chip less RFID tag according to embodiment A, wherein the delay in the microstrips is substantially constant per unit length.

Embodiment A3. The chipless RFID tag according to embodiment A, wherein the common port is connected to an antenna.

Embodiment A4. The chipless RFID tag according to embodiment A3, wherein the antenna is a micro-strip formed on said flexible substrate.

Embodiment B. A chipless RFID tag system comprising:
a. a transmitter sending an input signal;
b. a tag substrate having at least first and second microstrips, each of the microstrips having:
  i. an impedance mismatch of at least about 80% at the microstrip's termination, wherein said mismatch is determined by:

$$\left| \frac{Z_L - Z_T}{Z_L + Z_T} \right|$$

where $Z_L$ and $Z_T$ are the impedance associated with the transmission line and its termination, respectively.
and
  ii. a different length from the other microstrip; and
c. a receiver detecting at least two primary reflections and at least one secondary reflection of said input signal from said microstrips and identifying relative time domain positions of the reflections to one another.

Embodiment B1. The chipless RFID tag system according to embodiment B, wherein the second microstrip is at least twice as long as the first microstrip.

Embodiment B2. The chip less RFID tag system according to embodiment B, wherein the microstrips are meandering.

Embodiment B3. The chipless RFID tag system according to embodiment B, wherein the different lengths of the microstrips cause the signal reflections to have a sufficient time period between the reflections to differentiate separate reflections.

Embodiment B4. The chipless RFID tag system according to embodiment B3, wherein the different lengths of the microstrips cause the reflections to form a detectable on/off pattern of at least four bits.

Embodiment B5. The chipless RFID tag system according to embodiment B3, wherein the length of the first microstrip (L1) and that of the second microstrip (L2) are approximately equal to:

$$L1 = (i'-i) \times T \times I$$

$$L2 = (i'-1) \times T \times I$$

where i and i' are the position of the second and the third pulses, respectively; I is the length of transmission line required for 1 ns reflection delay, and T is the bit width.

Embodiment B6. The chipless RFID tag system according to embodiment B, wherein said microstrips have either a substantially open or a substantially grounded termination.

Embodiment B7. The chipless RFID tag system according to embodiment B, wherein said receiver and said transmitter are combined as a transceiver.

Embodiment C. A chipless RFID tag system comprising:
a. a transmitter sending an input signal;
b. a tag substrate having at least one microstrip, the microstrip having a first portion with a first impedance and a second portion with a second impedance different from said first impedance.
c. a receiver detecting at least two reflections from an interface of the first and second impedances and identifying relative time domain positions of the reflections to one another.

Embodiment C1. The chipless RFID tag system according to embodiment C, wherein there is an impedance mismatch between the first and second line equal to:

$$\left|\frac{Z_1 - Z_2}{Z_1 + Z_2}\right|$$

where $Z_1$ and $Z_2$ are the impedance associated with the first and second lines, respectively and the impedance mismatch between the first and second lines is between about 20% and about 40%.

Embodiment C2. The chipless RFID tag system according to embodiment C, wherein said tag system includes a sensor which selectively allows transmission of reflections based upon the presence or absence of a activating condition.

Embodiment C3. The chipless RFID tag system according to c embodiment C2, wherein said sensor is positioned between said antenna and said microstrips.

Embodiment C4. The chipless RFID tag system according to embodiment C2, wherein said sensor operates by changing at least one of the dielectric, electrical, mechanical, chemical, optical, or biological properties in response to said activating condition.

Embodiment C5. The chipless RFID tag system according to embodiment C2, wherein said activating condition is the presence of an organic gas.

Embodiment D. A chipless RFID tag system comprising:
a. a transmitter sending an input signal;
b. a tag substrate having at least one microstrip, the microstrip having a phase discontinuity altering the phase of a signal reflection at the discontinuity; and
c. a receiver detecting a change in phase between at least two reflections from the input signal and identifying relative (time domain?) positions of the reflections based upon said phase change.

Embodiment E(35). A chipless RFID tag system comprising:
a. a transmitter sending an input signal
b. a tag substrate having at least first and second transmission lines, each of transmission lines having:
i. either a substantially ground or substantially open termination
ii. different length from the other line
c. a receiver detecting at least two primary reflections and at least one secondary reflection of said input signal from said transmission lines and identifying the relative phase of the reflections to one another.

Embodiment E1. The chipless RFID tag system according to embodiment E, wherein there is at least 80% mismatch between the line and the termination impedance.

Embodiment E2. The chipless RFID tag system according to embodiment E, wherein the second transmission line is twice as long as the first line.

Embodiment E3. The chipless RFID tag system according to embodiment E, wherein the transmission lines comprise microstrip lines.

Embodiment E4. The chipless RFID tag system according to embodiment E, wherein the transmission lines are meandered.

Embodiment E5. The chipless RFID tag system according to embodiment E, wherein one of the lines is substantially ground terminated and another of the lines is substantially open terminated.

Embodiment E6. The chipless RFID tag system according to embodiment E, wherein the different lengths of transmission lines cause the signal reflections to have sufficient time period between the reflections to detect the phase change.

Embodiment E7. The chipless RFID tag system according to embodiment E6, wherein the different termination of lines causes to form a detectable phase modulated pattern of at least two bits.

Embodiment F. A chipless RFID tag system comprising:
a. a transmitter sending an input signal;
b. a tag substrate having at least one microstrip, the microstrip having at least two inductor/capacitor elements creating at least two delays in transmission of the input signal; and
c. a receiver detecting the at least two delays from the inductor/capacitor and identifying relative time domain positions of the delayed signals to the input signal.

Still further embodiments include those shown in The Masters Thesis of Sireesha Ramisetti, entitled, "Design And Development Of An ID Generation Circuit For Low-Cost Passive RFID-Based Applications," La Tech University, November 2005, which is incorporated by reference herein in its entirety.

We claim:

1. A chipless RFID tag system comprising:
a transmitter sending an input signal;
a chipless RFID tag comprising a tag substrate having a first microstrip and a second microstrip, wherein the second microstrip is at least twice as long as the first microstrip and the first and second microstrips have substantially uniform impedance along its length;
wherein said chipless RFID tag further comprises at least one tap positioned between the first and second microstrips allowing one-way transmission of the input signal from the second to the first microstrip;
wherein the first and second microstrips have a common input port to receive said input signal;
wherein the first microstrip outputs a tag response signal determined by said at least one tap.

2. The chipless RFID tag system according to claim 1, wherein the tap is positioned such that a transmission delay in the second microstrip is greater than a duration of the input signal.

3. The chipless RFID tag system according to claim 2, wherein the tap is positioned such that the transmission delay is a multiple of the duration of the input signal.

4. The chipless RFID tag system according to claim 1, wherein the second microstrip is terminated with a load which is approximately equal to a characteristic impedance of the second microstrip.

5. The chipless RFID tag system according to claim 1, wherein multiple taps are positioned between said first and second microstrips.

6. The chipless RFID tag system according to claim 1, wherein the second microstrip runs along a meandering path.

* * * * *

UNITED STATES PATENT AND TRADEMARK OFFICE
CERTIFICATE OF CORRECTION

| | | |
|---|---|---|
| PATENT NO. | : 8,179,231 B1 | Page 1 of 1 |
| APPLICATION NO. | : 11/864159 | |
| DATED | : May 15, 2012 | |
| INVENTOR(S) | : Khodadad Varahramyan et al. | |

It is certified that error appears in the above-identified patent and that said Letters Patent is hereby corrected as shown below:

Title page, Item (73) Assignee: should read

--(73) Assignee: Louisiana Tech Research Foundation; a Division of Louisiana Tech University Foundation, Inc.--

Signed and Sealed this
Tenth Day of July, 2012

David J. Kappos
*Director of the United States Patent and Trademark Office*